(12) United States Patent
Cai et al.

(10) Patent No.: US 10,416,399 B1
(45) Date of Patent: Sep. 17, 2019

(54) OPTICAL FIBER CONNECTOR

(71) Applicant: Dongguan Lan Guang Plastic Moulding Co., Ltd., Dongguan (CN)

(72) Inventors: Xinde Cai, You County (CN); Jianbo Lan, Luzhou (CN); Xianghua Gu, Heng Yang County (CN); Wei Zhao, Xing Wen County (CN)

(73) Assignee: DONGGUAN LAN GUANG PLASTIC MOULDING CO., LTD., Dongguan, Guangdong Province (CN)

( * ) Notice: Subject to any disclaimer, the term of this patent is extended or adjusted under 35 U.S.C. 154(b) by 0 days.

(21) Appl. No.: 16/109,984

(22) Filed: Aug. 23, 2018

(30) Foreign Application Priority Data

Jun. 27, 2018 (CN) .................. 2018 2 10039853 U

(51) Int. Cl.
*G02B 6/42* (2006.01)

(52) U.S. Cl.
CPC .......... *G02B 6/4239* (2013.01); *G02B 6/423* (2013.01); *G02B 6/428* (2013.01); *G02B 6/4214* (2013.01); *G02B 6/4244* (2013.01); *G02B 6/4292* (2013.01)

(58) Field of Classification Search
CPC ...... G02B 6/423; G02B 6/428; G02B 6/4214; G02B 6/4239; G02B 6/4292; G02B 6/423; G02B 6/4244
USPC ......................................................... 385/89
See application file for complete search history.

(56) References Cited

U.S. PATENT DOCUMENTS

| | | | | |
|---|---|---|---|---|
| 6,504,107 B1* | 1/2003 | Kragl | ............ | G02B 6/4214 174/260 |
| 6,796,663 B2* | 9/2004 | Detro | ............ | G02B 27/283 348/E9.027 |
| 7,150,569 B2* | 12/2006 | Oono | ............ | G02B 6/4206 385/88 |
| 7,726,885 B2* | 6/2010 | Nishimura | ............ | G02B 6/3885 385/147 |
| 8,746,990 B2* | 6/2014 | Chang | ............ | G02B 6/4284 385/88 |
| 8,834,041 B2* | 9/2014 | Ertel | ............ | G02B 6/3817 385/49 |
| 9,866,328 B2* | 1/2018 | Wang | ............ | H04B 10/40 |
| 2006/0171627 A1* | 8/2006 | Aoki | ............ | G02B 6/1221 385/14 |
| 2014/0321807 A1* | 10/2014 | Sakai | ............ | G02B 6/122 385/14 |

(Continued)

*Primary Examiner* — Akm E Ullah
(74) *Attorney, Agent, or Firm* — Dragon Sun Law Firm, PC; Jinggao Li, Esq.

(57) ABSTRACT

Disclosed is an easily fixed optical fiber connector, including a connecting member, an optical component and an optical fiber. The connecting member is provided with an hole, an optical fiber core of the optical fiber passes through the hole; an end surface of the optical fiber core is flush with an end surface of the connecting member; the optical component is provided with an slot, an end of the connecting member is inserted into the slot; the connecting member is fixedly connected to the optical component; a bottom edge of the optical component is provided with a plurality of notches; the bottom of each of the notches is formed with an inclined surface; the inclined surface extends from a side to the bottom of the optical component; a recess is formed at the bottom of the optical component; and a circuit board is disposed below the optical component.

7 Claims, 2 Drawing Sheets

(56) References Cited

U.S. PATENT DOCUMENTS

2015/0260929 A1* 9/2015 Matsumaru .......... G02B 6/4214
                                                      385/52
2017/0131494 A1* 5/2017 Hsieh .................. G02B 6/4277

* cited by examiner

OPTICAL FIBER CONNECTOR

CROSS-REFERENCE TO RELATED APPLICATION

This application claims priority from CN Application No. 2018210039853, filed Jun. 27, 2018, the contents of which is incorporated herein in the entirety by reference.

TECHNICAL FIELD

The present disclosure relates to an optical fiber connector, in particular to an easily fixed optical fiber connector.

BACKGROUND

An optical fiber connector is a device that connects optical fibers to each other by precisely butting two end surfaces of the optical fibers, such that optical energy output from the transmitting optical fiber can be coupled to the receiving optical fiber to the maximum extent and the impact on the system caused by its interference with the optical link can be minimized, which is a basic requirement for an optical fiber connector. To some extent, the optical fiber connector affects the reliability and various performances of an optical transmission system.

With the rapid development of network requirements, fiber optic equipment has higher and higher requirements for a data communication rate, and also has increasingly higher requirements for the stability and reliability of the connector. An optical component of the existing optical fiber connector is usually glued at the bottom and bonded to a circuit board by glue, but this fixing method has a poor bonding effect and cannot ensure that the optical component is stably and reliably fixed to the circuit board. Moreover, in the existing optical fiber connector, an optical component and connecting member thereof are made of different materials, so that due to the influence of cold and heat factors, the optical component and the connecting member are deformed to different degrees, in a long term resulting in failure to reliably connect the optical component to the connecting member, which in turn affects the accuracy of optical signal transmission. To avoid the impact of deformation, the optical component and the connecting member could be manufactured in larger and thicker size; however, this may lead to a problem that the overall size of the optical fiber connector is too large to meet application requirements and future development needs.

SUMMARY

In view of the shortcomings in the prior art, the technical problem to be solved by the present disclosure is to provide an optical fiber connector which can ensure that an optical component is reliably bonded and fixed to a circuit board, thereby improving the structural stability and overall performance.

In order to solve the above-mentioned technical problem, the present disclosure adopts the technical solution as follows:

an easily fixed optical fiber connector, comprising a connecting member, an optical component and an optical fiber, wherein the connecting member is provided with an insertion hole, an optical fiber core of the optical fiber passes through the insertion hole, an end surface of the optical fiber core is flush with an end surface of the connecting member, the optical component is provided with an insertion slot, an end of the connecting member is inserted into the insertion slot, the connecting member is fixedly connected to the optical component, a bottom edge of the optical component is provided with a plurality of notches, the bottom of each of the notches is formed with an inclined surface, the inclined surface extends from a side to the bottom of the optical component, the plurality of notches are sequentially distributed in a circumferential direction of the optical component, a recess is formed at the bottom of the optical component, a circuit board is disposed below the optical component, the optical component is bonded to the circuit board at the joint by glue, and the glue is filled into the notches and the recess.

Preferably, the optical component is provided with a first optical path opening and a second optical path opening, an end of the optical fiber core is aligned with the first optical path opening, and a light guiding device for conducting a light beam is disposed between the first optical path opening and the second optical path opening.

Preferably, the connecting member is a T-shaped connecting member comprising two shoulders and one projection, two opposite inner edges are formed at a top opening of the insertion slot, and the projection is inserted between the inner edges and the insertion slot.

Preferably, a first inclined portion is formed at the edge of either side of the projection, a second inclined portion is formed at a corner of the insertion slot, and the first inclined portion and the second inclined portion are attached to each other.

Preferably, two positioning posts are formed on the optical component, the positioning posts are disposed in the insertion slot, the connecting member is provided with two positioning holes, the positioning holes penetrate through two ends of the connecting member, the positioning holes and the positioning posts are in one-to-one alignment, and the positioning posts are inserted into the positioning holes.

Preferably, the optical fiber is a ribbon optical fiber comprising a plurality of optical fiber cores, the connecting member is provided with a plurality of insertion holes, and the optical fiber cores and the insertion holes are in one-to-one alignment.

Preferably, a plurality of light guiding devices arranged side by side are provided in the optical component, the light guiding devices and the optical fiber cores are in one-to-one correspondence, the light guiding device comprises a reflector inclining at an angle of 45°, and a photoelectric element is provided in the second optical path opening.

Preferably, the connecting member and optical component are devices made of the same material.

Preferably, the recess has a recess depth of 50 µm.

In the easily fixed optical fiber connector disclosed in the present disclosure, the optical component is bonded to the circuit board at the joint by glue, so that the glue can be filled into the notches and the recess, and under the function of the notches and the recess, it is possible to not only increase the bonding area of the glue on the circuit board, but also overcome a greater stress after bonding and fixing, thereby adapting to various environmental changes to avoid the influence on the performance of products due to the deformation of the connector, so as to effectively meet the application requirements and have a good market prospect.

DETAILED DESCRIPTION OF EMBODIMENTS

The present disclosure will be described in more detail in conjunction with the accompanying drawings and embodiments.

Figure 1:
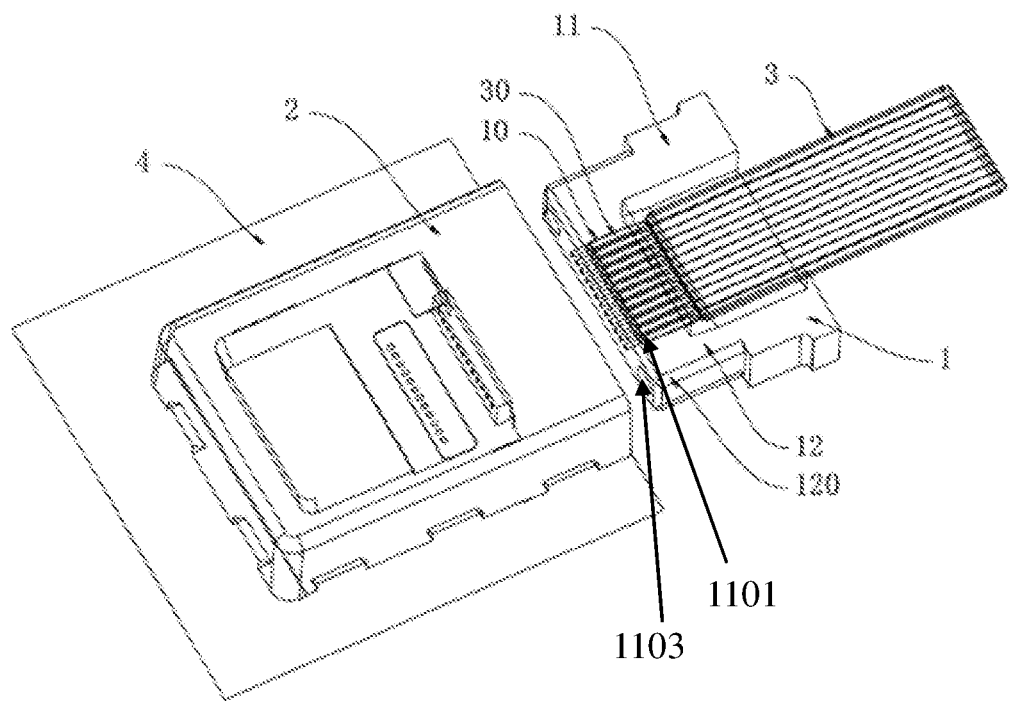
FIG. 1 is a first perspective view of an optical fiber connector of the present disclosure.
Figure 2:
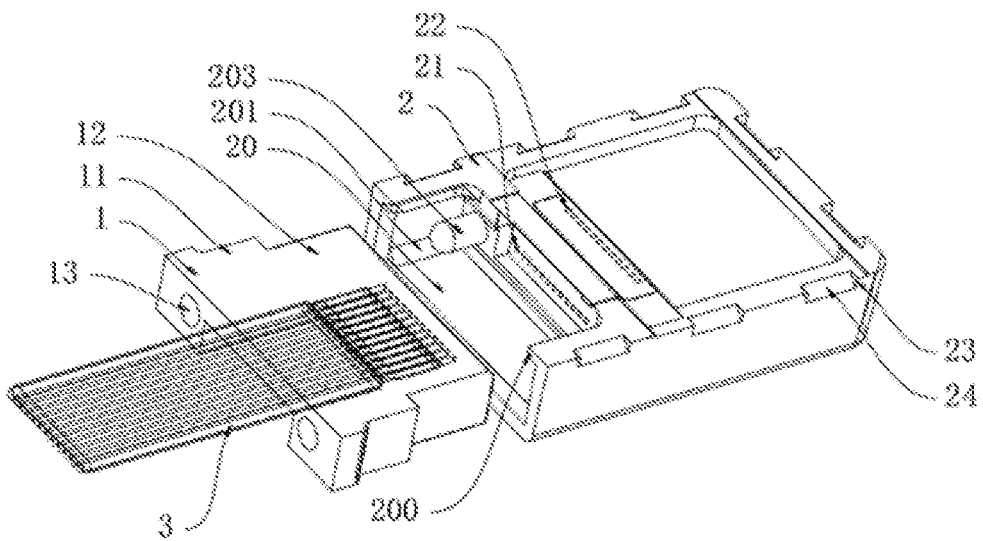
FIG. 2 is a second perspective view of an optical fiber connector of the present disclosure.
Figure 3:
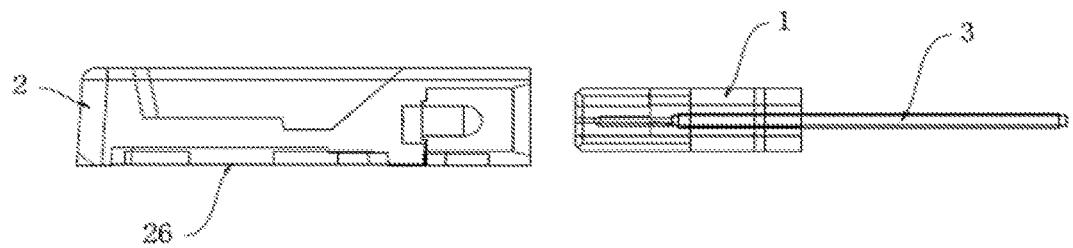
FIG. 3 is a side view of an optical fiber connector of the present disclosure.
Figure 4:
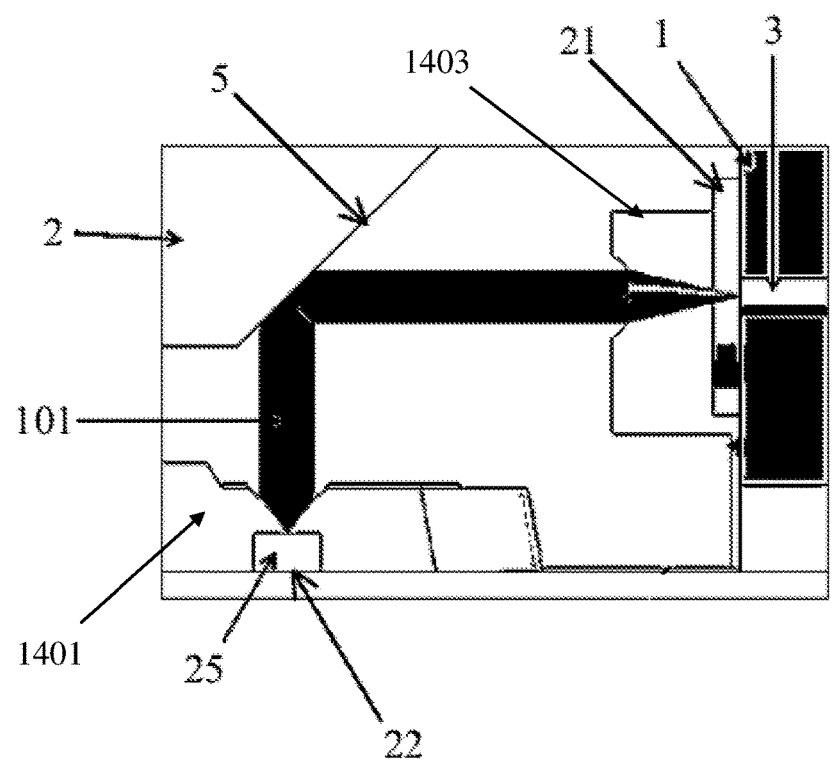
FIG. 4 is a schematic diagram of the internal structure of an optical component.

The present disclosure discloses an easily fixed optical fiber connector, as shown in FIGS. 1 to 4, comprising a connecting member 1, an optical component 2 and an optical fiber 3, wherein the connecting member 1 is provided with an insertion hole 10, an optical fiber core 30 of the optical fiber 3 passes through the insertion hole 10, an end surface 1101 of the optical fiber core 30 is flush with an end surface 1103 of the connecting member 1, the optical component 2 is provided with an insertion slot 20, an end of the connecting member 1 is inserted into the insertion slot 20, the connecting member 1 is fixedly connected to the optical component 2, a bottom edge of the optical component 2 is provided with a plurality of notches 23, the bottom of each of the notches 23 is formed with an inclined surface 24, the inclined surface 24 extends from a side to the bottom of the optical component 2, the plurality of notches 23 are sequentially distributed in a circumferential direction of the optical component 2, a recess 26 is formed at the bottom of the optical component 2, a circuit board 4 is disposed below the optical component 2, the optical component 2 is bonded to the circuit board 4 at the joint by glue, and the glue is filled into the notches 23 and the recess 26.

In the above-mentioned optical fiber connector, the optical component 2 is bonded to the circuit board 4 at the joint by glue, so that the glue can be filled into the notches 23 and the recess 26, and under the function of the notches 23 and the recess 26, it is possible to not only increase the bonding area of the glue on the circuit board 4, but also overcome a greater stress after bonding and fixing, thereby adapting to various environmental changes to avoid the influence on the performance of products due to the deformation of the connector, so as to effectively meet the application requirements and have a good market prospect.

In this embodiment, the optical component 2 is provided with a first optical path opening 21 and a second optical path opening 22, an end of the optical fiber core 30 is aligned with the first optical path opening 21, and a light guiding device for conducting a light beam 101 is disposed between the first optical path opening 21 and the second optical path opening 22.

During processing, the end surface of the optical fiber core 30 can be processed by grinding or laser cutting.

In this embodiment, the connecting member 1 is a T-shaped connecting member comprising two shoulders 11 and one projection 12, two opposite inner edges 200 are formed at a top opening of the insertion slot 20, and the projection 12 is inserted between the inner edges 200 and the insertion slot 20. The shoulders 11 are bonded and fixed to the optical component 2 at the joint by glue.

As a preferred embodiment, a first inclined portion 120 is formed at the edge of either side of the projection 12, a second inclined portion 201 is formed at a corner of the insertion slot 20, and the first inclined portion 120 and the second inclined portion 201 are attached to each other. Under the cooperation of the first inclined portion 120 and the second inclined portion 201, it is possible to not only achieve the precise alignment of the connecting member 1 and the optical component 2, but also enlarge the contact surface after the insertion therebetween, which helps to enhance the stability and reliability of the connecting member and the optical component after connection.

In this embodiment, two positioning posts 203 are formed on the optical component 2, the positioning posts 203 are disposed in the insertion slot 20, the connecting member 1 is provided with two positioning holes 13, the positioning holes 13 penetrate through two ends of the connecting member 1, the positioning holes 13 and the positioning posts 203 are in one-to-one alignment, and the positioning posts 203 are inserted into the positioning holes 13.

As a preferred embodiment, the optical fiber 3 is a ribbon optical fiber comprising a plurality of optical fiber cores 30, the connecting member 1 is provided with a plurality of insertion holes 10, and the optical fiber cores 30 and the insertion holes 10 are in one-to-one alignment.

As regards the internal optical structure arrangement of the optical component 2, a plurality of light guiding devices arranged side by side are provided in the optical component 2, the light guiding devices and the optical fiber cores 30 are in one-to-one correspondence, the light guiding device comprises a reflector 5 inclining at an angle of 45°, and a photoelectric element 25 is provided in the second optical path opening 22. The working principle comprises:

at a transmitting end, light emitted by the photoelectric element is converged into parallel or parallel-like light via a first lens 1401 in the light guiding device, is totally reflected when it is propagated to a 45° reflector 5, is converged into a collimated light spot via a second lens 1403, and is then incident on an end surface of an optical fiber core, the end surface of the optical fiber core being processed by grinding or laser cutting; and at a receiving end, light emitted by the optical fiber core is converged into parallel or parallel-like light via the second lens 1403, is totally reflected when it is propagated to the 45° reflector 5, is converged into a collimated light spot via the first lens 1401, and is then incident on a photoelectric induction face of a top face of the photoelectric element, so that current is excited and converted into an electrical signal.

As a preferred embodiment, the connecting member 1 and optical component 2 are devices made of the same material. Using the same material is advantageous in that, when a product is affected by the ambient temperature factor, since the connecting member 1 and the optical component 2 have the same deformation coefficient, the device can be protected against inconsistent expansion under the influence of the device itself and the ambient temperature during operation, thereby preventing power loss. In addition, based on the above features, there is no need to make the connecting member 1 and the optical component 2 too large or too thick in size, thereby meeting the application requirements and future development needs.

In this embodiment, the recess 26 has a recess depth of 50 μm.

The easily fixed optical fiber connector disclosed in the present disclosure not only has a better bonding effect and more stable product structure, but also can meet small size requirements. Moreover, the optical fiber connector is easy to assemble and inspect, can effectively improve the production efficiency, and can be widely applied to photoelectric emission devices of 40 G, 100 G and HDMI type products, thereby achieving high-speed data transmission.

The above description is merely a preferred embodiment of the present disclosure and is not intended to limit the present disclosure, and the modifications, equivalent alternatives, improvements, etc. made within the technical scope of the present disclosure are all intended to be included within the scope of the present disclosure.

What is claimed is:

1. An optical fibre connector, comprising:
a connecting member having a first end surface;
an optical component having a first opening path; and
an optical fibre having an optical fibre core, wherein
the connecting member is provided with an insertion hole;
the optical fibre core of the optical fibre passes through the insertion hole;
the optical fibre core of the optical fibre has a second end surface, and the second end surface of the optical fibre core of the optical fibre is flush with the first end surface of the connecting member;
the optical component is provided with an insertion slot;
an end of the connecting member is inserted into the insertion slot;
the connecting member is fixedly connected to the optical component;
a bottom edge of the optical component is provided with a plurality of notches;
the bottom of each of the notches is formed with an inclined surface;
the inclined surface extends from a side to the bottom of the optical component;
the plurality of notches is sequentially distributed in a circumferential direction of the optical component;
a recess is formed at the bottom of the optical component;
a circuit board is disposed below the optical component;
the optical component is bonded to the circuit board at the joint by glue;
the glue is filled into the notches and the recess;
the first end surface and the second end surface that are in flush with each other are aligned with one end of the first opening path and in contact with the one end of the first opening path;
the optical component has two positioning posts disposed in the insertion slot;
the connecting member has two positioning holes that penetrate through two ends of the connecting member;
the positioning holes and the positioning posts are in one-to-one alignment; and
the positioning posts are inserted into the positioning holes so that the connecting member and optical component are connected with each other.

2. The optical fiber connector of claim 1, wherein the optical component is provided with a second optical path opening.

3. The optical fiber connector of claim 2, wherein the connecting member is a T-shaped connecting member comprising two shoulders and one projection;
two opposite inner edges are formed at a top opening of the insertion slot;
the projection is inserted between the inner edges and the insertion slot;
a first inclined portion is formed at the edge of either side of the projection;
a second inclined portion is formed at a corner of the insertion slot; and
the first inclined portion and the second inclined portion are attached to each other.

4. The optical fiber connector of claim 3, wherein the optical fiber is a ribbon optical fiber comprising a plurality of optical fiber cores;
the connecting member is provided with a plurality of insertion holes; and the optical fiber cores and the insertion holes are in one-to-one alignment.

5. The optical fiber connector of claim 4, wherein the optical component comprises:
a plurality of light guiding devices arranged side by side, wherein the plurality of light guiding devices is disposed between the first optical path opening and the second optical path opening;
a first lens;
a second lens;
a reflector inclining at an angle of 45°;
a photoelectric element provided in the second optical path opening;
the light guiding devices and the optical fiber cores are in one-to-one correspondence;
the light guide devices conduct a light beam between the first optical path opening and the second optical path opening;
at a transmitting end, light emitted by the photoelectric element is converged into parallel light via the first lens in the light guiding device; is reflected by the reflector; then is converged into a first collimated light spot via a second lens; and is then incident on an end surface of an optical fiber core; and
at a receiving end, light emitted by the optical fiber core is converged into light via the second lens, is reflected by the reflector; is converged into a second collimated light spot via the first lens, and is then incident on a photoelectric induction face of a top face of the photoelectric element.

6. The optical fiber connector of claim 1, wherein the connecting member and optical component are devices made of the same material.

7. The optical fiber connector of claim 1, wherein the recess has a recess depth of 50 μm.

* * * * *